United States Patent
Hikosaka

(10) Patent No.: US 12,518,383 B2
(45) Date of Patent: Jan. 6, 2026

(54) MEDICAL IMAGE PROCESSING APPARATUS, METHOD THEREOF FOR GENERATING SECOND EXAMINATION DATA INCLUDES SECOND ATTENDANT DATA, AND NON-TRANSITORY COMPUTER-READABLE STORAGE MEDIUM

(71) Applicant: CANON KABUSHIKI KAISHA, Tokyo (JP)

(72) Inventor: Manami Hikosaka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 241 days.

(21) Appl. No.: 18/473,398

(22) Filed: Sep. 25, 2023

(65) Prior Publication Data
US 2024/0135535 A1 Apr. 25, 2024
US 2024/0233120 A9 Jul. 11, 2024

(30) Foreign Application Priority Data

Oct. 24, 2022 (JP) .................................. 2022-170032

(51) Int. Cl.
*G06T 7/00* (2017.01)
*G06V 10/764* (2022.01)
(Continued)

(52) U.S. Cl.
CPC .......... *G06T 7/0012* (2013.01); *G06V 10/764* (2022.01); *G16H 30/20* (2018.01); *G06T 11/60* (2013.01); *G06T 2207/30008* (2013.01)

(58) Field of Classification Search
None
See application file for complete search history.

(56) References Cited

U.S. PATENT DOCUMENTS 8,095,388 B2 * 1/2012 Masuzawa ............. G16H 15/00
705/3
2002/0122578 A1 * 9/2002 Akahori ............... A61B 6/5229
382/132

(Continued)

FOREIGN PATENT DOCUMENTS

| JP | 2008-200138 A | 9/2008 |
| JP | 2012-066119 A | 4/2012 |
| JP | 2015-100661 A | 6/2015 |

*Primary Examiner* — Haris Sabah
(74) *Attorney, Agent, or Firm* — Carter, DeLuca & Farrell LLP

(57) ABSTRACT

A medical image processing apparatus communicably connected to an imaging apparatus obtains first examination data including image information about a medical image obtained by imaging by the imaging apparatus and first attendant information added to the image information, performs processing of the image information included in the first examination data, and generates second examination data including processing result information obtained by the processing and second attendant information that includes at least part of the first attendant information and is added to the processing result information. The image information and the processing result information are associated by at least part of the first attendant information commonly included in the first attendant information and the second attendant information.

17 Claims, 15 Drawing Sheets

(51) Int. Cl.
*G16H 30/20* (2018.01)
*G06T 11/60* (2006.01)

(56) References Cited

U.S. PATENT DOCUMENTS

| | | | | |
|---|---|---|---|---|
| 2003/0063785 A1* | 4/2003 | Oosawa | ............... | G06T 7/0012 |
| | | | | 382/128 |
| 2006/0239395 A1* | 10/2006 | Abe | ...................... | G01N 23/04 |
| | | | | 378/1 |
| 2013/0253954 A1* | 9/2013 | Sugihara | ............... | G16H 30/20 |
| | | | | 705/3 |
| 2023/0084622 A1 | 3/2023 | Hikosaka | | |

* cited by examiner

FIG. 2

| EXAMINATION ID | PATIENT ID | PATIENT NAME | GENDER | BIRTH DATE | AGE |
|---|---|---|---|---|---|
| O001 | P333 | SABURO GANON | MALE | 1981/11/11 | 29 |
| O002 | P222 | JIRO GANON | MALE | 2002/2/2 | 7 |
| O003 | P111 | TARO GANON | MALE | 2001/1/10 | 20 |
| O004 | P777 | HANAKO GANON | FEMALE | 1977/7/7 | 12 |
| O005 | P123 | ICHIRO GANON | MALE | 2003/3/3 | 3 |
| O006 | P444 | SHIRO GANON | MALE | 1964/4/4 | 45 |
| O007 | P555 | GORO GANON | MALE | 1955/5/5 | 54 |
| O008 | P666 | ROKURO GANON | MALE | 1976/6/6 | 33 |

PATIENT NAME:
BIRTH DATE: / /
PATIENT ID:
GENDER: ○ MALE  ○ FEMALE  ○ OTHER
AGE:

FINALIZE

PATIENT NAME: TARO GANON
PATIENT ID: P111
BIRTH DATE: 2001/1/10
AGE: 20
GENDER: MALE

EXAMINATION ID: O003

LUMBAR SPINE FRONT_1    SENSOR A  — 251
LUMBAR SPINE FRONT_2    SENSOR A  — 252

START EXAMINATION — 270

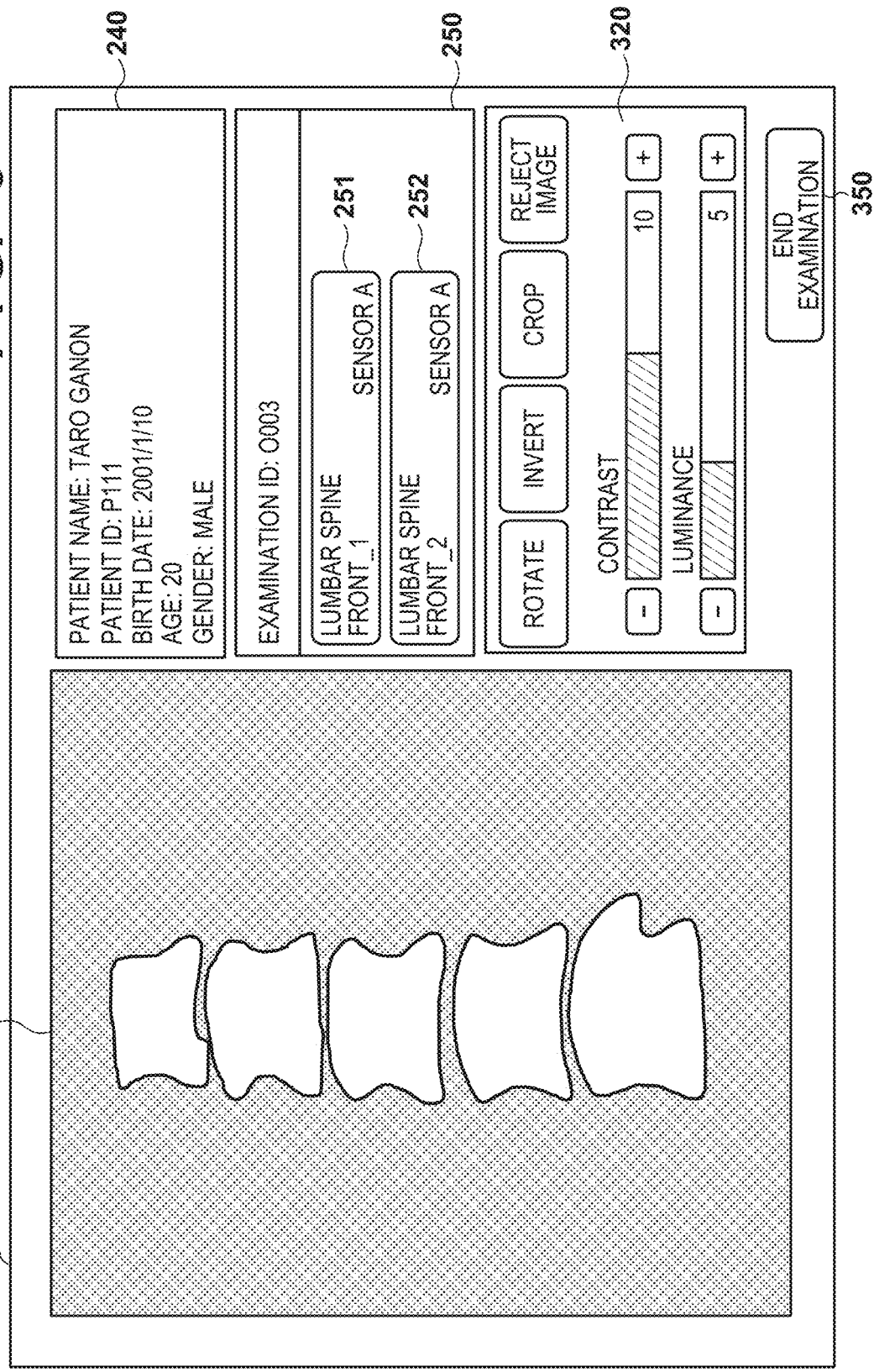

FIG. 8B

PATIENT INFORMATION — PATIENT ID, PATIENT NAME, BIRTH DATE
821

EXAMINATION INFORMATION — EXAMINATION ID, EXAMINATION DATE, EXAMINATION DESCRIPTION

SERIES INFORMATION — SERIES ID, APPARATUS INFORMATION, SITE

IMAGE INFORMATION — IMAGE ID, COLLECTION DATE AND TIME, SIZE

IMAGE INFORMATION — IMAGE ID, COLLECTION DATE AND TIME, SIZE

} MEDICAL IMAGING APPARATUS EXAMINATION DATA

EXAMINATION INFORMATION — EXAMINATION ID, EXAMINATION DATE, EXAMINATION DESCRIPTION
822

SERIES INFORMATION — SERIES ID, APPARATUS INFORMATION, SITE
823

IMAGE INFORMATION — IMAGE ID, COLLECTION DATE AND TIME, SIZE
824

} EXAMINATION DATA OF MEDICAL REPORT APPARATUS

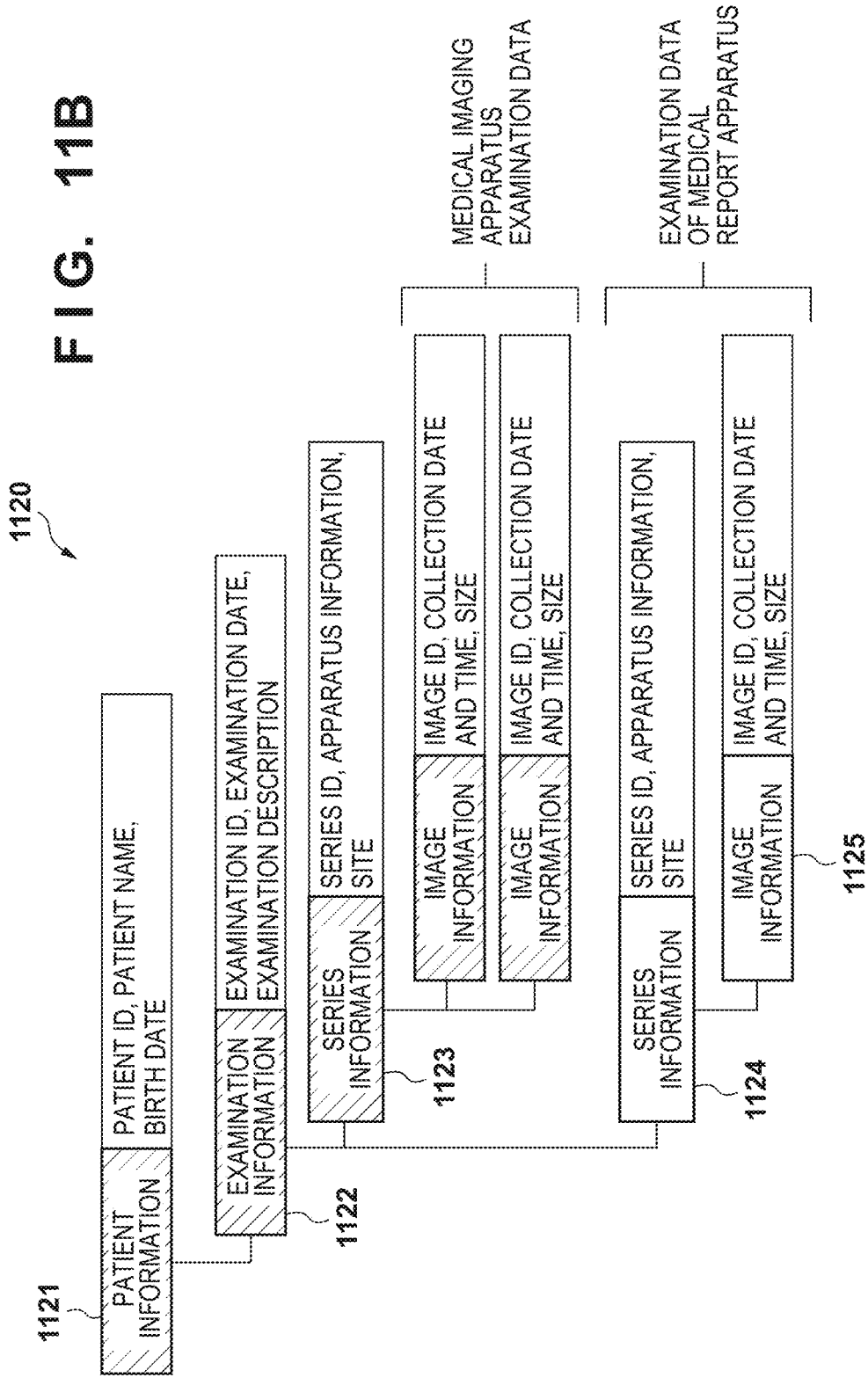

MEDICAL IMAGE PROCESSING APPARATUS, METHOD THEREOF FOR GENERATING SECOND EXAMINATION DATA INCLUDES SECOND ATTENDANT DATA, AND NON-TRANSITORY COMPUTER-READABLE STORAGE MEDIUM

BACKGROUND OF THE INVENTION

Field of the Invention

The present disclosure relates to a medical image processing apparatus, a control method thereof, a medical information generation apparatus, and a storage medium.

Description of the Related Art

Generally, medical images captured by a medical imaging apparatus (modality) such as a CT apparatus or a radiation imaging apparatus are grouped by the patient, modality, examination date and time, type of examination, and the like, and stored. When displaying a plurality of medical images on a medical image referencing apparatus, medical images belonging to a common group are displayed side by side. When generating medical image data by DICOM known as a typical standard of medical image data, group information called a series for grouping medical image data is used. DICOM stands for Digital Imaging and Communications in Medicine. Many modalities have a function of generating such group information and associating it with a medical image.

A medical image referencing apparatus has a function of, when referencing a group information-added medical image, displaying a plurality of medical images side by side for each group based on the group information. Medical images can be collected into a group more suitable for diagnosis, and displayed side by side on the medical image referencing apparatus. Japanese Patent Laid-Open No. 2012-066119 discloses a technique of performing such display by automatically generating group information without user effort so as to display medical images for each group on a medical image referencing apparatus. In some cases, at the time of executing an examination or image interpretation, another examination is referenced for a comparative diagnosis using a medical image obtained by the other examination. Japanese Patent Laid-Open No. 2008-200138 discloses a technique of, at the time of executing an examination, associating an image of a different examination in order to make an examination plan by referencing imaging information of a past similar examination. Also, Japanese Patent Laid-Open No. 2015-100661 discloses a technique of improving the efficiency of image interpretation by associating an image of a different examination in a picture archiving and communication system (PACS). That is, according to the related art, a plurality of examinations are associated after medical images to be associated are archived in an image archiving apparatus such as PACS.

SUMMARY OF THE INVENTION

According to one aspect of the present invention, there is provided a medical image processing apparatus communicably connected to an imaging apparatus, comprising: an obtaining unit configured to obtain first examination data including image information about a medical image obtained by imaging by the imaging apparatus, and first attendant information added to the image information; a processing unit configured to perform processing of the image information included in the first examination data; and a generating unit configured to generate second examination data including processing result information obtained by the processing, and second attendant information that includes at least part of the first attendant information and is added to the processing result information, wherein the image information and the processing result information are associated by at least part of the first attendant information commonly included in the first attendant information and the second attendant information.

Further features of the present invention will become apparent from the following description of exemplary embodiments with reference to the attached drawings.

BRIEF DESCRIPTION OF THE DRAWINGS

FIG. 2 is a view showing an example of the new examination input screen of a medical imaging apparatus according to the embodiment;

FIG. 3 is a view showing an example of the screen of the association setting of a medical report generation apparatus according to the embodiment;

FIGS. 8A and 8B are a flowchart and a view, respectively, for explaining examination data generation processing when "associate with patient information" is selected;

FIGS. 11A and 11B are a flowchart and a view, respectively, for explaining examination data generation processing when "associate with examination information" is selected.

DESCRIPTION OF THE EMBODIMENTS

Figure 1:
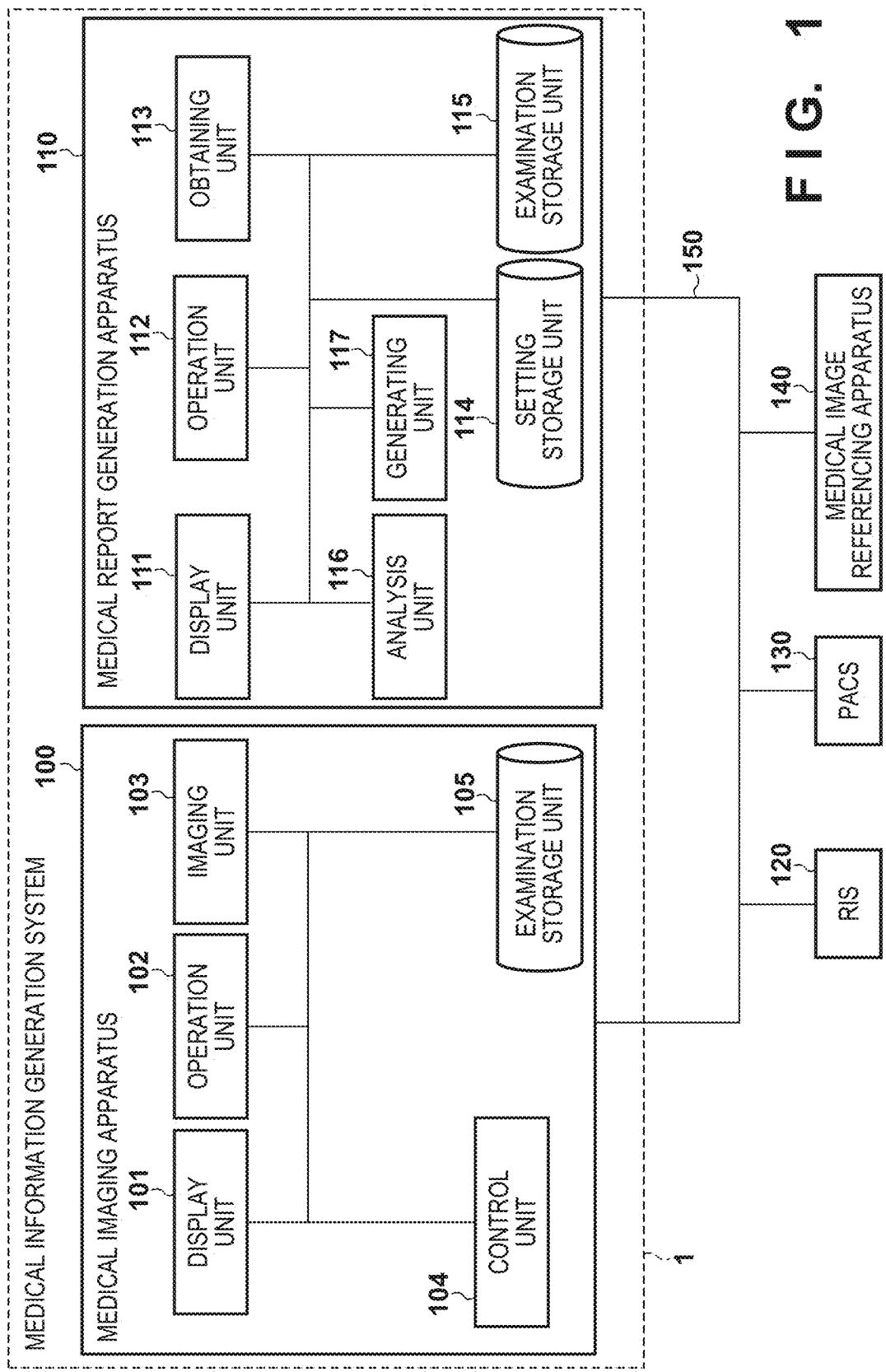
FIG. 1 is a block diagram showing an example of the arrangement of a medical information generation apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

When a plurality of examinations are associated using a general medical image referencing apparatus, it is necessary to check archived medical images and designate association after executing the plurality of examinations. When the result of processing a medical image and the medical image used for the processing are associated, work for associating the medical image and the processing result takes time and effort, and the efficiency of diagnosis may decrease.

According to one of techniques of the present disclosure, work of association between pieces of information can be performed efficiently.

<Arrangement of Medical Information Generation System>

FIG. 1 is a block diagram showing an example of the schematic arrangement of a medical information generation system 1 according to an embodiment. The medical information generation system 1 includes a medical imaging apparatus 100 and a medical report generation apparatus 110. The medical imaging apparatus 100 and the medical report generation apparatus 110 are connected communicably. The medical information generation system 1 is connected to a radiology information system (RIS) 120, a picture archiving and communication system (PACS) 130, and a medical image referencing apparatus 140 via a network 150. The network 150 is constituted by, for example, a local area network (LAN) or a wide area network (WAN). The network 150 can be a wired network or a wireless network.

The medical imaging apparatus 100 receives an examination order from the RIS 120, and captures a medical image. A control unit 104 displays the examination order, the captured medical image, and the like on a display unit 101, and provides a GUI screen to an operator user. An operation unit 102 receives an operation input (selection of an examination order, an imaging instruction, or the like) to the GUI screen provided by the display unit 101. An imaging unit 103 includes a radiation detector such as a flat panel detector (FPD). The imaging unit 103 provides, as a medical image, a radiation image obtained by radiation imaging using the radiation detector. The control unit 104 generates examination data including a medical image (entity) obtained by imaging a subject by the imaging unit 103, and attendant information attending the medical image, and stores the examination data in an examination storage unit 105. The examination data generated by the control unit 104 (medical imaging apparatus 100) will be called first examination data. The data structure of the first examination data will be described with reference to FIG. 4. The first examination data stored in the examination storage unit 105 is output to, for example, both the PACS 130 and the medical report generation apparatus 110 via the network 150. A doctor or an image interpreter makes a necessary diagnosis by referencing examination information and medical images stored in the PACS 130 using the medical image referencing apparatus 140. Note that the term "radiation" can include the X-ray, α-ray, β-ray, γ-corpuscular ray, cosmic ray, and the like in the embodiment.

The medical report generation apparatus 110 is an example of a medical image processing apparatus that obtains processing result information by processing a medical image obtained from the medical imaging apparatus 100. In the medical report generation apparatus 110, an obtaining unit 113 obtains the first examination data provided from the medical imaging apparatus 100. An analysis unit 116 analyzes a medical image included in the first examination data, and generates an analysis result image representing the analysis result. The analysis unit 116 displays, on a display unit 111, a medical image that is the target of analysis or the like obtained by the obtaining unit 113, and provides the user with a GUI screen for analysis processing. An operation unit 112 receives an operation input (selection of an examination order, an imaging instruction, or the like) to the GUI screen provided by the display unit 111. A generating unit 117 generates analysis result information including an image (entity of an analysis result) representing an analysis result obtained by the analysis unit 116. The analysis result information is an example of processing result information. Also, the generating unit 117 diverts at least part of attendant information included in the first examination data, generating attendant information attending the analysis result information. Then, the generating unit 117 generates second examination data including the analysis result information and the generated attendant information, and stores the second examination data in an examination storage unit 115. That is, the generating unit 117 generates the second attendant information that includes at least part of first attendant information included in the first examination data and is added to the analysis result information. Accordingly, the image information and the analysis result information (processing result information) are associated by at least part of the first attendant information commonly included in the first attendant information and the second attendant information. The second examination data stored in the examination storage unit 115 is output to, for example, the PACS 130 via the network 150 and stored.

The doctor or the image interpreter displays, on the medical image referencing apparatus 140, medical images and analysis result images obtained from the first examination data and second examination data stored in the PACS 130, references them, and makes a necessary diagnosis. For example, the medical imaging apparatus 100 can be implemented as a radiation imaging apparatus, and the medical report generation apparatus 110 can be implemented as a bone mineral density measurement apparatus. In this case, the medical imaging apparatus 100 performs radiation imaging on a measurement target site such as the lumbar spine, thigh bone, or forearm of a patient, and generates the first examination data including a radiation image as a medical image. The examination data generated by the medical imaging apparatus 100 is output to the medical report generation apparatus 110 and the PACS 130. The medical report generation apparatus 110 measures the bone mineral density based on the medical image included in the examination data transmitted from the medical imaging apparatus 100, generates the second examination data (bone mineral density report) including the measurement result, and outputs it to the PACS 130.

In the embodiment, an example in which a radiation image (medical image) obtained by imaging a subject using a radiation such as X-rays is applied as the "first examination data" will be explained. However, the present disclosure is not limited to this, and another examination data is also applicable. For example, a medical image obtained by another modality other than radiation imaging, such as an ultrasonic image, can be applied to the first examination data. Also, an example in which bone mineral density measurement data is generated using a radiation image (medical image) as the "second examination data" will be explained. However, the present disclosure is not limited to this, and another image processing (analysis processing) and a result obtained by the processing are also applicable. An example in which image data is obtained as an analysis result will be explained, but the present disclosure is not limited to this. For example, the analysis result information may include text data representing an analysis result.

<Examination Procedure (Medical Imaging Apparatus 100)>

Next, the procedure of examination by the medical imaging apparatus 100 and medical report generation apparatus 110 shown in FIG. 1 will be described with reference to FIGS. 2, 3, and 4.

In the medical imaging apparatus 100, the control unit 104 obtains an examination order from the RIS 120. The examination order includes patient information and examination information. The patient information includes pieces of information such as the patient ID, patient name, and birth date, and the examination information includes the examination ID and imaging information representing the contents of imaging to be executed on the patient. The control unit 104 displays a new examination input screen on the display unit 101 based on the obtained examination order.

FIG. 2 is a view showing an example of a new examination input screen 200 displayed on the display unit 101. The new examination input screen 200 shown in FIG. 2 includes a patient information input area 210, a patient information OK button 220, a requested examination list display area 230, a patient information display area 240, an imaging information display area 250, and an examination start button 270.

In the requested examination list display area 230, a requested examination list in which examination orders received from the RIS 120 are lined up is displayed. The operator selects, via the operation unit 102, any one examination from the requested examination list displayed in the requested examination list display area 230. When an examination 231 (examination ID=0003) is selected as exemplified in FIG. 2, patient information (patient ID, patient name, birth date, and the like) corresponding to a patient of the selected examination 231 is displayed in the patient information display area 240. The examination ID (0003) of the selected examination 231 is displayed in the imaging information display area 250, and imaging information corresponding to the examination ID is displayed in an area immediately below the area where the examination ID is displayed. In the example shown in FIG. 2, a lumbar spine front_1 button 251 and a lumbar spine front_2 button 252 are arranged as imaging method buttons corresponding to the imaging information. The operator presses the examination start button 270 after confirming the patient information and imaging information displayed on the display unit 101. When the examination start button 270 is pressed, the medical imaging apparatus 100 finalizes an examination to be executed, and displays an imaging screen as shown in FIG. 3 on the display unit 101.

FIG. 3 is a view showing an example of an imaging screen 300 displayed on the display unit 101. In FIG. 3, the same reference numerals as those in FIG. 2 denote similar parts. The imaging screen 300 is a screen used as the time of imaging. The imaging screen 300 includes an image display area 310, an image processing operation area 320, the patient information display area 240, the imaging information display area 250, and an examination end button 350. The operator selects either of the lumbar spine front_1 button 251 and the lumbar spine front_2 button 252 serving as imaging method buttons, thereby selecting an imaging method. At the start of displaying the imaging screen 300, the lumbar spine front_1 button 251 as an imaging method button arranged at the top in the imaging information display area 250 is selected as a default. The medical imaging apparatus 100 (control unit 104) prepares radiation imaging by the imaging unit 103 in accordance with imaging conditions set in correspondence with an imaging method associated with the selected imaging method.

After confirming the selected imaging method, the operator performs setting of imaging and positioning of the patient to complete a series of imaging preparations, and then performs radiation imaging using the imaging unit 103. Upon completion of radiation imaging, the control unit 104 obtains a radiation image (radiation image signal) from the radiation detector of the imaging unit 103, and executes image processing on the obtained radiation image based on predetermined image processing conditions. The predetermined image processing conditions are defined in advance in correspondence with, for example, the imaging method. After image processing ends, the control unit 104 displays the radiation image having undergone the image processing in the image display area 310.

By operating a button provided in the image processing operation area 320, the operator can change, for example, the contrast of the radiation image displayed in the image display area 310. By repeating the above-described procedures, the operator executes imaging by all imaging methods displayed in the imaging information display area 250. After all imaging operations end, the operator presses the examination end button 350. In response to the press of the examination end button 350, a series of examinations ends, and the medical imaging apparatus 100 displays again the new examination input screen 200 shown in FIG. 2 on the display unit 101. At this time, the control unit 104 generates examination data (first examination data) including image information and attendant information of a radiation image (medical image) that was not handled as a photographic failure (rejected image), and outputs the first examination data to the medical report generation apparatus 110 and an external storage device such as the PACS 130. For example, the first examination data including two radiation images of the lumbar spine imaged with the lumbar spine front_1 button 251 and the lumbar spine front 2 button 252 at different tube voltages for bone mineral density measurement are generated and output.

Figure 4:
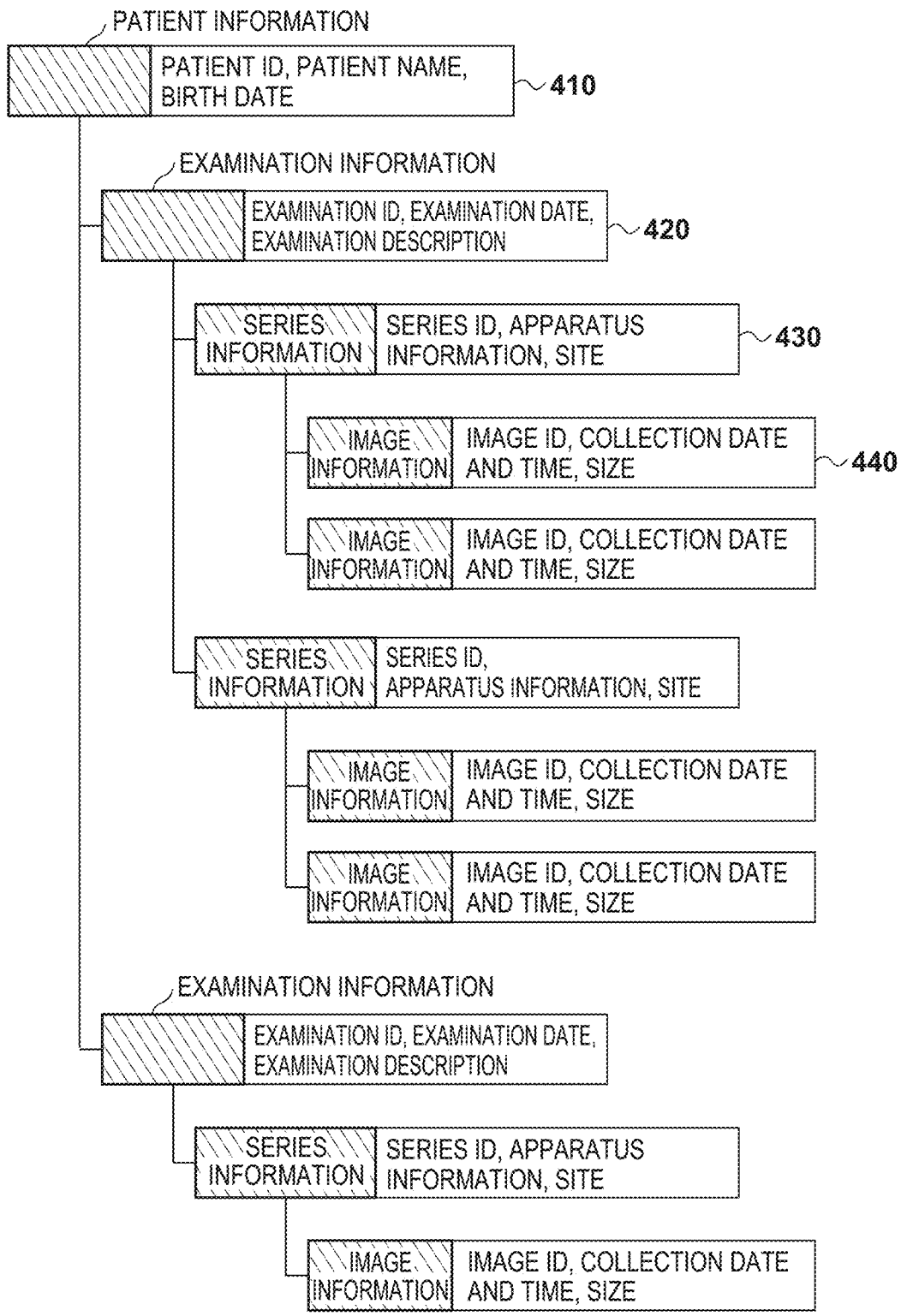
FIG. 4 is a view showing an example of a screen at the time of imaging by the medical imaging apparatus according to the embodiment.

FIG. 4 is a view showing an example of the data structure of the first examination data generated by the medical imaging apparatus 100. In the first examination data, image information including a medical image (entity) and identification information such as an image ID for identifying the medical image is recorded together with, for example, relevant information including hierarchical class information. The relevant information is an example of attendant information. Note that the image information includes the entity of a medical image. However, the present disclosure is not limited to this, and image information and the entity of a medical image may be linked by an identification ID. In this example, the hierarchical structure for classifying image information has four layers, as shown in FIG. 4. The node of the fourth layer serving as the top layer is patient information 410. The node of the third layer below the fourth layer is examination information 420, that of the second layer below the third layer is series information 430, and image information 440 serves as the node of the first layer. As shown in FIG. 4, the patient information 410 includes information that specifies a patient to be examined, such as the patient ID, patient name, and birth date. One or more pieces of the examination information 420 are stored in the patient information 410, and include information that specifies an examination, such as the examination ID and examination date and time, and an examination description that describes a notation about the examination or the like. One or more pieces of the series information 430 are stored in the examination information 420, and include information that specifies a series, such as the series ID and collection date and time, apparatus information including the type (modality) of an apparatus that performed an examination, and a site representing an examination target site. One or more pieces of the image information 440 are stored in the series information 430, and include information that specifies an image, such as the image ID and collection date and time, information necessary for image reproduction, such as a size, and image data serving as the entity of the image. Note that the data structure shown in FIG. 4 complies with the digital imaging and communications in medicine (DICOM) standard. That is, patient information, examination information, series information, and image information correspond to patient information of a patient level, study information of a study level, series information of a series level, and image information of an instance level in the DICOM standard.

<Examination Procedure (Medical Report Generation Apparatus 110)>

Next, processing of the medical report generation apparatus 110 to analyze the first examination data output from the medical imaging apparatus 100, and generate and output the second examination data including the analysis result will be described with reference to FIGS. 5 to 11. As described above, relevant information included in the first examination data represents a class to which image information belongs by a plurality of layers including the first layer whose node is image information for specifying a medical image. The medical report generation apparatus 110 generates relevant information for analysis result information by diverting information of the class of upper layers up to a predetermined layer out of the class of a plurality of layers in relevant information of the first examination data.

Figure 5:
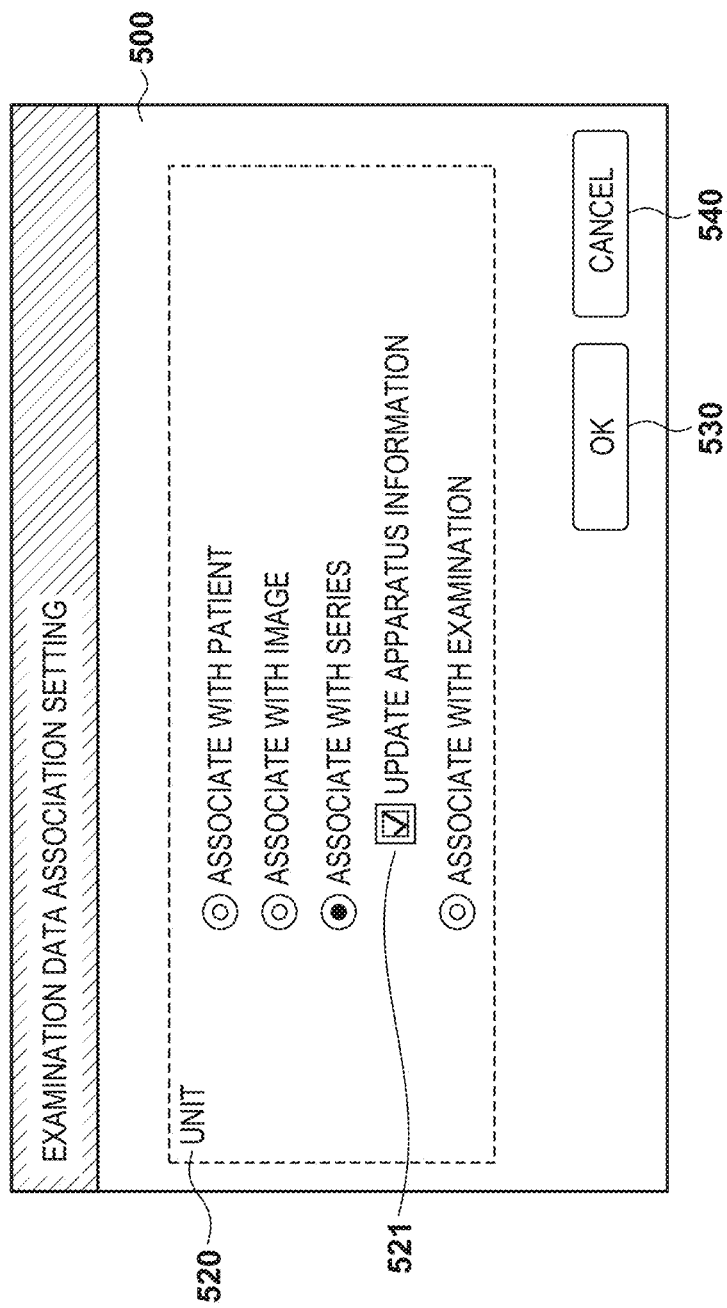
FIG. 5 is a view showing an example of the analysis screen of examination data of the medical report generation apparatus according to the embodiment.

FIG. 5 is a view showing an example of a screen for setting an analysis result association method in the second examination data generated by the medical report generation apparatus 110. The medical report generation apparatus 110 associates the first examination data used for analysis and an analysis result by diverting at least part of relevant information included in the first examination data and generating relevant information of the analysis result. A setting screen 500 includes an association selecting portion 520 for selecting the unit of association, an OK button 530, and a cancel button 540. When the OK button 530 is pressed, information (association setting information) representing the unit of association selected at the association selecting portion 520 (to be described later) is stored in a setting storage unit 114, and the setting screen 500 is closed. When the cancel button 540 is pressed, information representing the unit of association selected at the association selecting portion 520 is discarded, and the setting screen 500 is closed. In this case, the association setting information stored in the setting storage unit 114 is not updated.

The association selecting portion 520 allows selecting a layer (any one of a plurality of layers shown in FIG. 4) of relevant information included in the first examination data input from the medical imaging apparatus 100, with which generated analysis result information is associated. For example, when "associate with a patient" is selected at the association selecting portion 520, the medical report generation apparatus 110 generates relevant information for the second examination data by diverting patient information included in relevant information of the first examination data. This processing will be described in detail with reference to FIG. 8. When "associate with an image" is selected, the medical report generation apparatus 110 adds, to analysis result information included in the second examination data, reference information to image information (or a medical image used for analysis) included in the first examination data. As the reference information, an image ID such as SOP Instance UID can be used. Note that when "associate with an image" is selected, relevant information for the second examination data is generated by diverting patient information included in relevant information of the first examination data, similar to the case "associate with patient information". This processing will be described in detail with reference to FIG. 9.

When "associate with a series" is selected at the association selecting portion 520, the medical report generation apparatus 110 generates relevant information by diverting examination information and series information of the first examination data, and generates the second examination data including the generated relevant information and analysis result information. In the embodiment, the user can select whether to update apparatus information included in the series information. The apparatus information included in the series information represents, for example, the modality of an apparatus that captured a medical image. When an "update apparatus information" check box 521 is checked, apparatus information included in series information is updated to apparatus information of the medical report generation apparatus 110 in relevant information of the second examination data. When the check box 521 is not checked, the apparatus information is not updated. This processing will be described in detail with reference to FIG. 10. When "associate with an examination" is selected at the association selecting portion 520, the medical report generation apparatus 110 diverts examination information of the first examination data. In this case, the medical report generation apparatus 110 generates new series information and adds it to generate relevant information and generate the second examination data including the generated relevant information and analysis result information. This processing will be described in detail with reference to FIG. 11.

Figure 6:
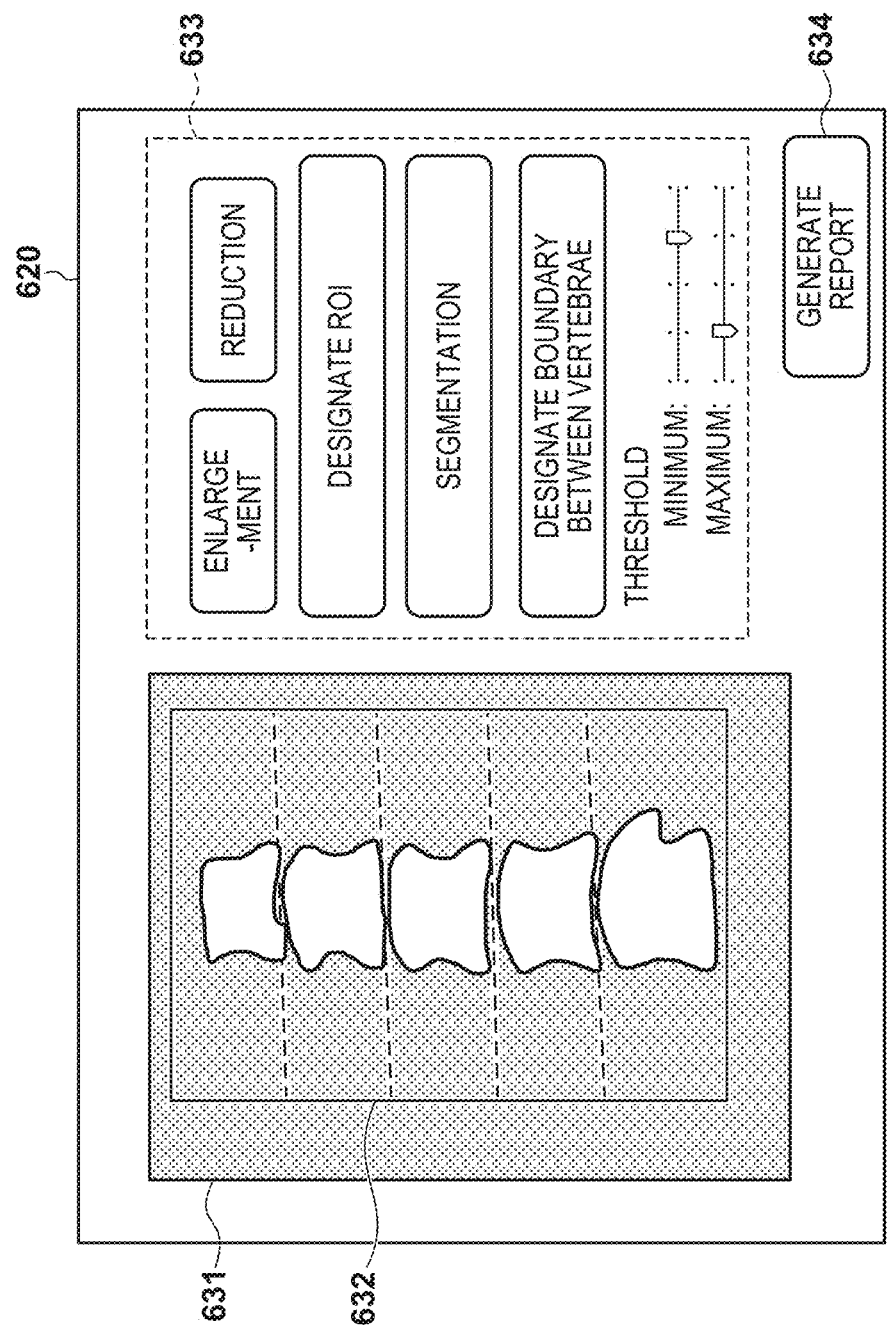
FIG. 6 is a view showing an example of the structure of examination data.

FIG. 6 is a view showing an example of an analysis screen displayed on the display unit 111 by the medical report generation apparatus 110 according to the embodiment. In FIG. 6, an analysis screen 620 is a screen used at the time of analysis to generate a medical report by the medical report generation apparatus 110. The analysis screen 620 includes an image display area 631, an analysis processing operation area 633, and a report generation button 634.

The analysis unit 116 of the medical report generation apparatus 110 displays the analysis screen 620 on the display unit 111. The analysis unit 116 displays, in the image display area 631 of the analysis screen 620, a medical image that is the target of analysis that is included in the first examination data obtained by the obtaining unit 113 from the medical imaging apparatus 100. The operator selects an operation necessary for analysis from the analysis processing operation area 633, and executes it on the medical image displayed in the image display area 631. For example, it is assumed that the medical report generation apparatus 110 generates a medical report about bone salt information by dual X-ray absorptiometry (DXA) for diagnosis of the bone mineral density. In this case, the operator selects, from the analysis processing operation area 633, ROI setting that designates a vertebral body region, segmentation setting that designates the region of each vertebra, intervertebral setting that designates the boundary between vertebrae, and the like, and arranges an image processing object 632 in the image display area 631. Upon completion of an image operation necessary to generate a medical report, the operator presses the report generation button 634. In response to the press of the report generation button 634, the analysis unit 116 analyzes the medical image based on the settings in the analysis processing operation area 633 and the image processing object 632, and generates a medical report including the analysis result. In the embodiment, an image (analysis result image) representing the analysis result is generated as the medical report. After a series of analysis processes ends and the analysis result image is obtained, the generating unit 117 generates relevant information corresponding to the unit of association set on the setting screen 500, and adds it to the analysis result image, thereby generating the second examination data. The generated second examination data is output to a storage device such as the PACS 130. Note that an image (for example, a bone image for bone mineral density measurement) generated during the analysis, or an object (for example, the image processing object 632) set on an image for analysis may be included as analysis result information. For example, analysis result information including an image as displayed in the image display area 631 in FIG. 6 may be generated in addition to analysis result information including an image representing an analysis result.

Figure 7:
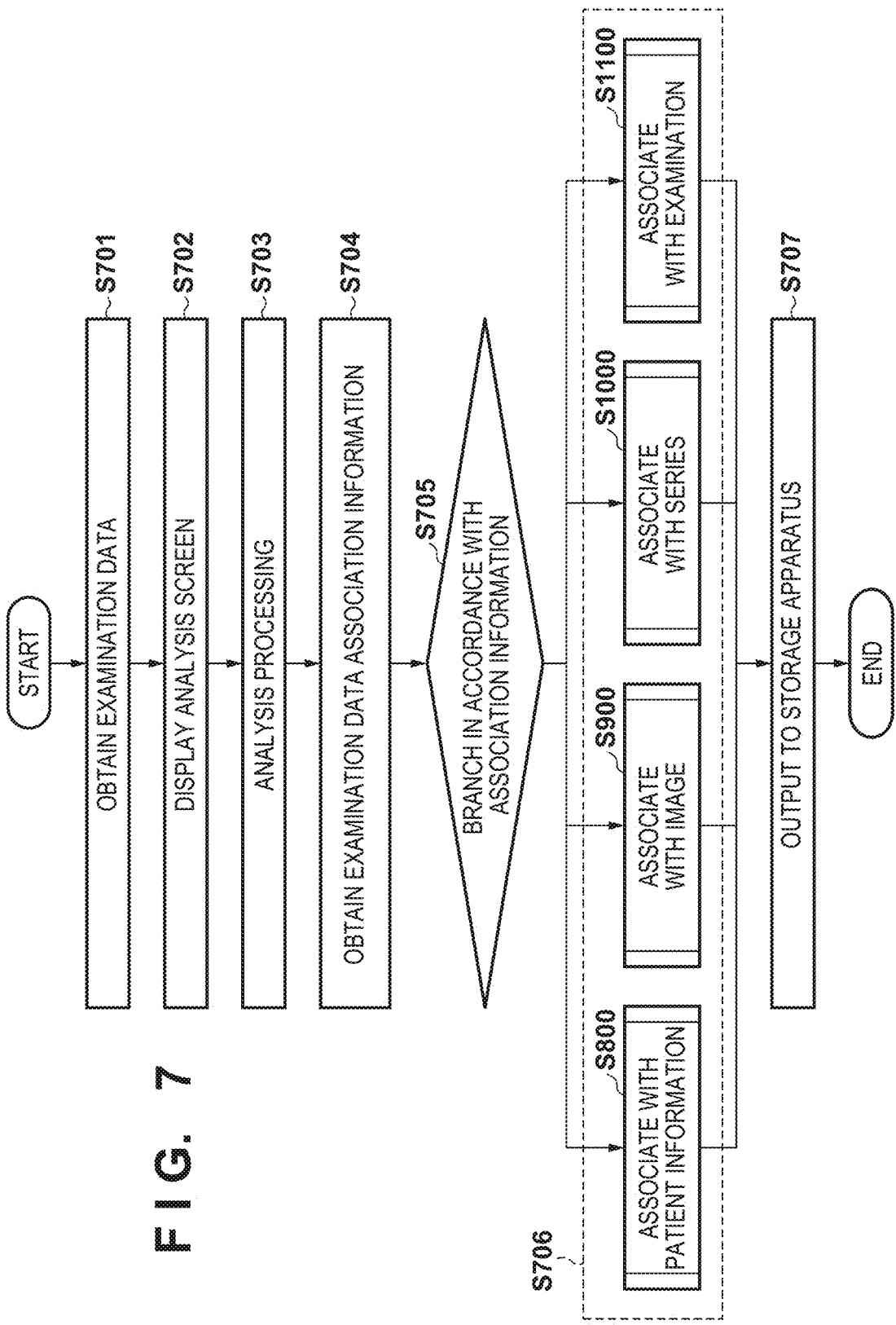
FIG. 7 is a flowchart showing an example of examination data association processing according to the embodiment.

FIG. 7 is a flowchart showing an example of examination data generation processing by the medical report generation apparatus 110 according to the embodiment. In step S701, the obtaining unit 113 obtains, from the medical imaging apparatus 100, the first examination data including a medical image that is the target of analysis. The obtained first examination data is stored in the examination storage unit 115. In step S702, the analysis unit 116 displays the analysis screen 620 and displays the medical image included in the first examination data in the image display area 631. In step S703, the analysis unit 116 executes the above-described analysis processing, generating a medical report. As described above, in this example, a medical report including an analysis result image is generated.

In step S704 and subsequent steps, the generating unit 117 adds relevant information to image information of the analysis result image, generating the second examination data. More specifically, the generating unit 117 generates relevant information in accordance with information of the unit of association stored in the setting storage unit 114, and generates examination data (second examination data) using the generated relevant information and the image information of the analysis result image.

First, in step S704, the generating unit 117 obtains association setting information representing the unit of association stored in the setting storage unit 114. Then, in step S705, the generating unit 117 selects an association method in accordance with the association setting of examination data represented by the obtained association setting information. In step S706, the generating unit 117 generates relevant information in accordance with the association setting of examination data, and generates the second examination data based on the analysis result information and the relevant information (steps S800, S900, S1000, and S1100). In step S707, the generating unit 117 outputs the generated second examination data to an external storage device such as the PACS 130. In this manner, the examination data (second examination data) that is generated by the medical report generation apparatus 110 and includes the analysis result image is archived in the PACS 130.

<Case where Association Setting is "Associate with Patient Information">

Figure 8A:
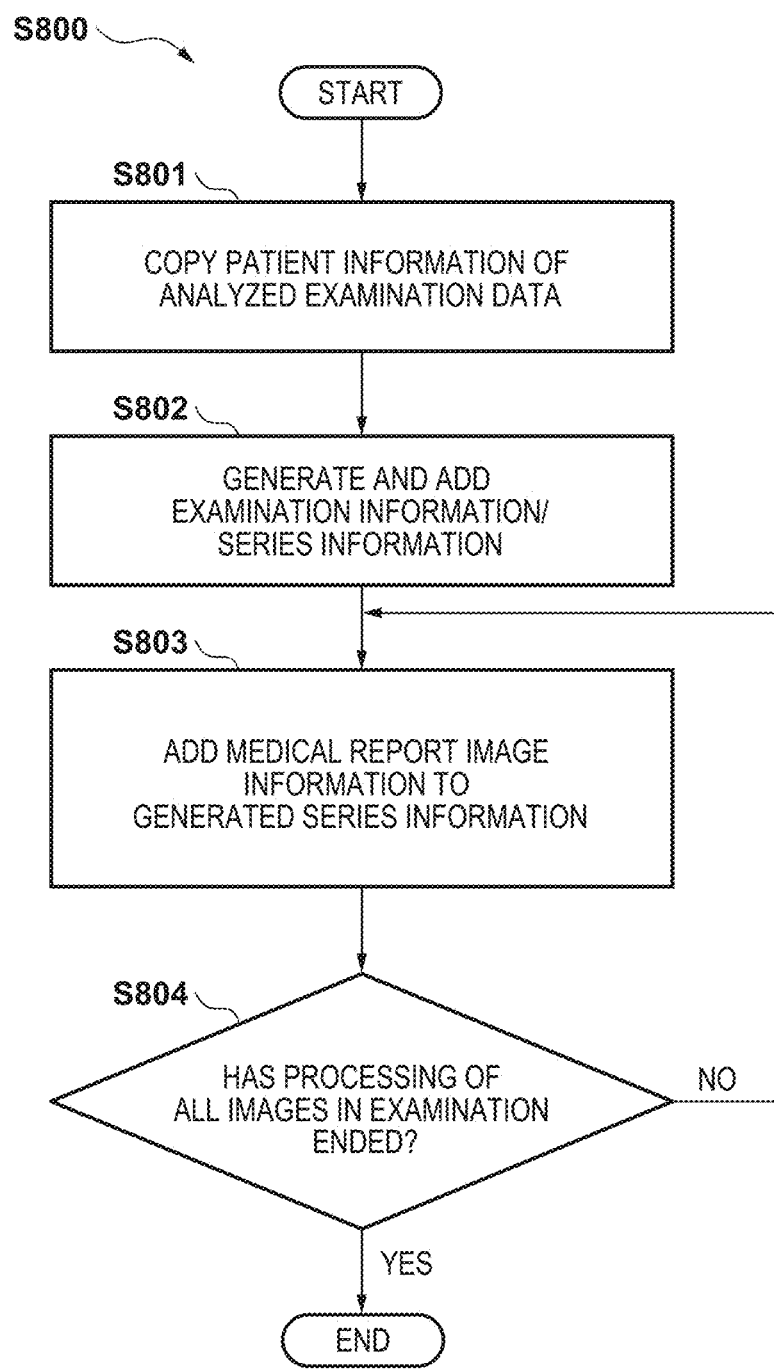

Next, the processing in step S706 will be explained. First, details of processing (step S800) when the association setting information is "associate with patient information" will be described with reference to FIGS. 8A and 8B. FIG. 8A is a flowchart showing examination data generation processing by the generating unit 117 when the association setting is "associate with patient information". FIG. 8B is a view showing an example of the structure of the second examination data generated when the association setting is "associate with patient information".

In step S801, the generating unit 117 copies patient information from relevant information of a medical image that is the target of analysis (first examination data). In step S802, the generating unit 117 newly generates examination information and series information to be associated with analysis result information. Note that an examination ID and series ID different from those of examination information and series information input from the medical imaging apparatus 100 are added to the examination information and series information generated in step S802. With the different IDs, the examination information and series information generated in step S802 are handled as examination information and series information different from the examination information and series information of the first examination data. As apparatus information included in the series information, information representing the modality of the medical report generation apparatus 110 is used. For example, as shown in FIG. 8B, examination information 822 generated in step S802 is associated with patient information 821 obtained in step S801, and series information 823 generated in step S802 is associated with the examination information 822. In step S803, the generating unit 117 generates image information 824 as analysis result information, and associates it with the series information 823. In step S804, it is determined whether processing has ended for all analysis result images. If it is determined that processing has not ended for all analysis result images (NO in step S804), the process returns to step S803. If it is determined that processing has ended for all analysis result images (YES in step S804), the generating unit 117 ends the processing and outputs, as the second examination data, the patient information, examination information, series information, and image information generated in steps S802 and S803. In the example of FIG. 8B, the patient information 821, the examination information 822, the series information 823, and the image information 824 are generated as relevant information for the analysis result image, and output as the second examination data. According to the above-described processing, the second examination data is added as new examination data associated with the patient information of the first examination data in the PACS 130. The second examination data is handled as an examination different from the first examination data, but the medical image that is the target of analysis and the analysis result image are associated by the patient information.

<Case where Association Setting is "Associate with Image">

Figure 9A:
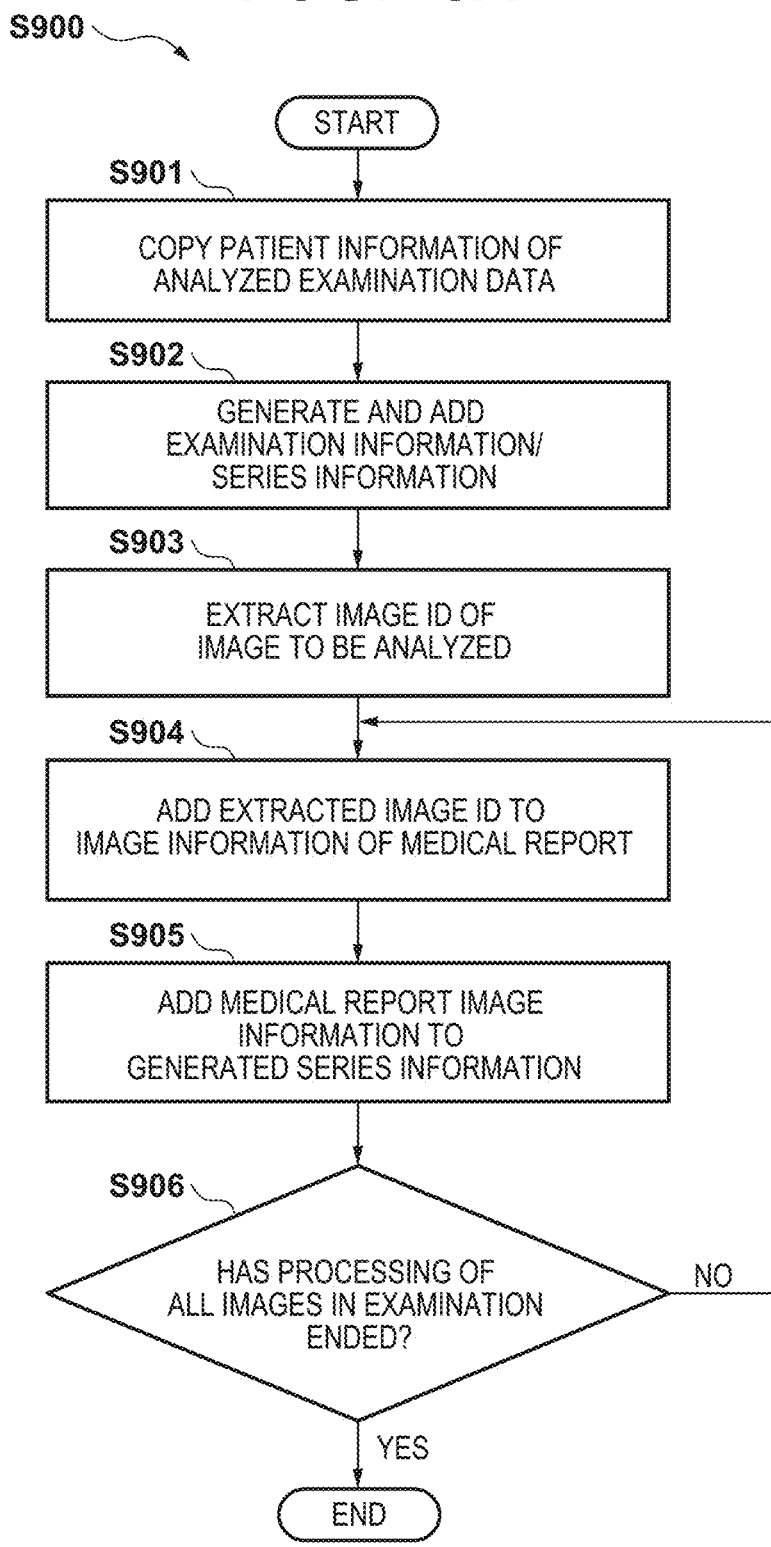
FIGS. 9A and 9B are a flowchart and a view, respectively, for explaining examination data generation processing when "associate with an image" is selected.
Figure 9B:
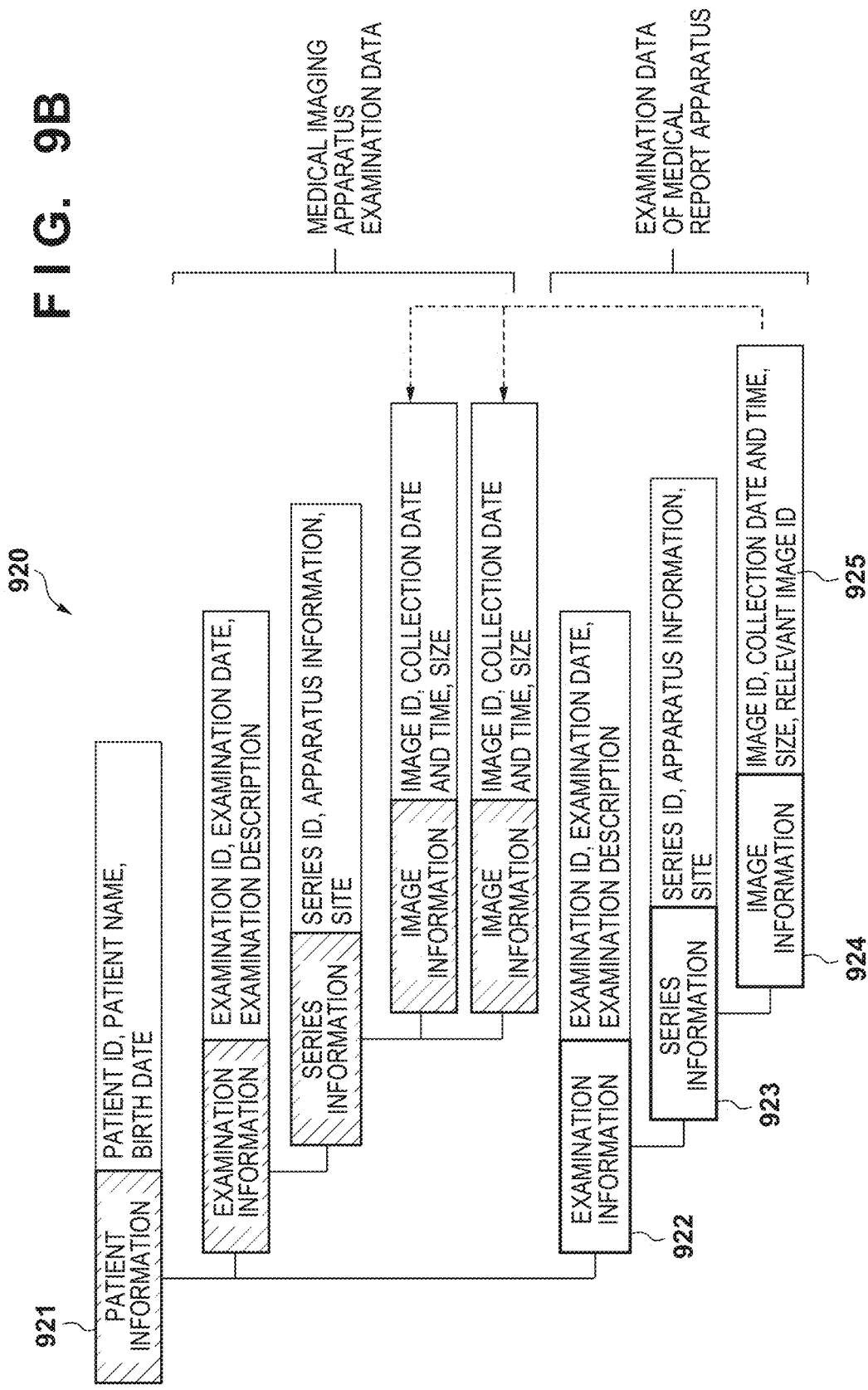

Next, processing of the generating unit 117 when "associate with an image" is set as the association setting will be described. FIG. 9A is a flowchart showing examination data generation processing by the generating unit 117 when the association setting is "associate with an image". FIG. 9B is a view showing an example of the structure of the second examination data generated when the association setting is "associate with an image". Details of processing (step S900) when the association setting information represents "associate with an image" in step S705 will be described with reference to FIGS. 9A and 9B. When "associate with an image" is selected, the generating unit 117 adds an image ID for identifying a medical image that is generated by the medical imaging apparatus 100 and used for analysis, thereby associating the medical image with an analysis result image.

In step S901, the generating unit 117 copies patient information from relevant information of a medical image that is the target of analysis (first examination data). In step S902, the generating unit 117 newly generates examination information and series information. The processing in step S902 is similar to that in step S802. As shown in FIG. 9B, examination information 922 generated in step S902 is associated with patient information 921 obtained in step S901, and series information 923 generated in step S902 is associated with the examination information 922. IDs different from those of examination information and series information of the first examination data are added to the examination information 922 and series information 923 generated by the generating unit 117, and the examination information 922 and series information 923 are handled as different examination information and series information. In step S903, the generating unit 117 extracts an image ID from image information of a medical image that is the target of analysis by the analysis unit 116. In step S904, the generating unit 117 adds, as a relevant image ID 925, the image ID extracted in step S903 to image information 924 of an analysis result image generated by the medical report generation apparatus 110. In this way, identification information for identifying a medical image that is the target of analysis is added to the image information of the analysis result. In step S905, the generating unit 117 generates the second examination data using the image information 924 and the relevant information (patient information 921, examination information 922, and series information 923) generated in steps S901 and S902. If the above-described processing has been performed on image information of all analysis result images generated by the analysis unit 116 (YES in step S906), the process ends.

According to the above-described processing, the second examination data generated by the generating unit 117 has the same patient information as the patient information generated by the medical imaging apparatus 100, and has the analysis result image generated by the analysis unit 116. When the second examination data is stored in the PACS 130 and displayed by the medical image referencing apparatus 140, the image information included in the second examination data is handled as an examination different from the first examination data output from the medical imaging apparatus 100. However, the relevant image ID that enables reference to a medical image that is the target of analysis is added to the image information included in the second examination data from the medical report generation apparatus 110. Thus, the captured image that is the target of analysis can be easily detected.

<Case where Association Setting is "Associate with Series">

Figure 10A:
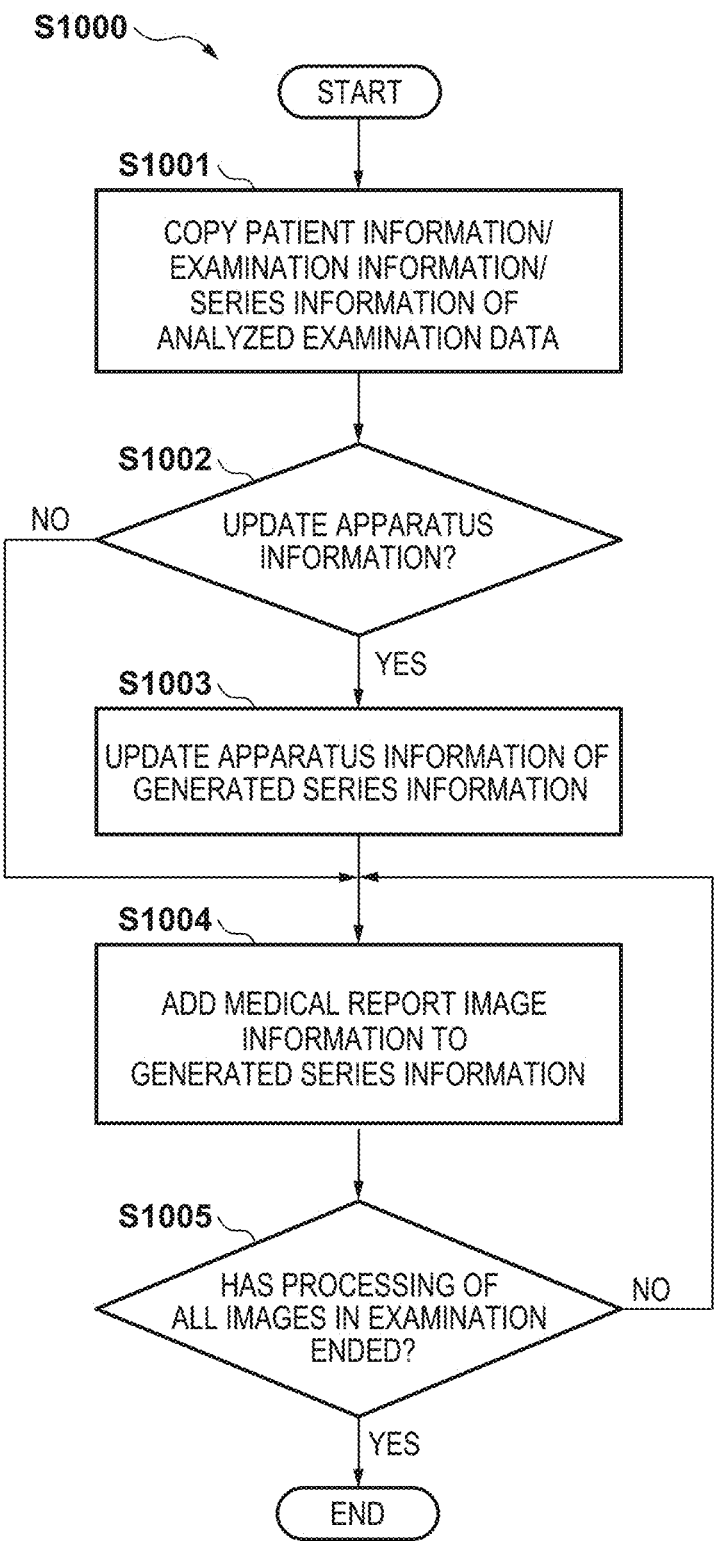
FIGS. 10A and 10B are a flowchart and a view, respectively, for explaining examination data generation processing when "associate with series information" is selected.
Figure 10B:
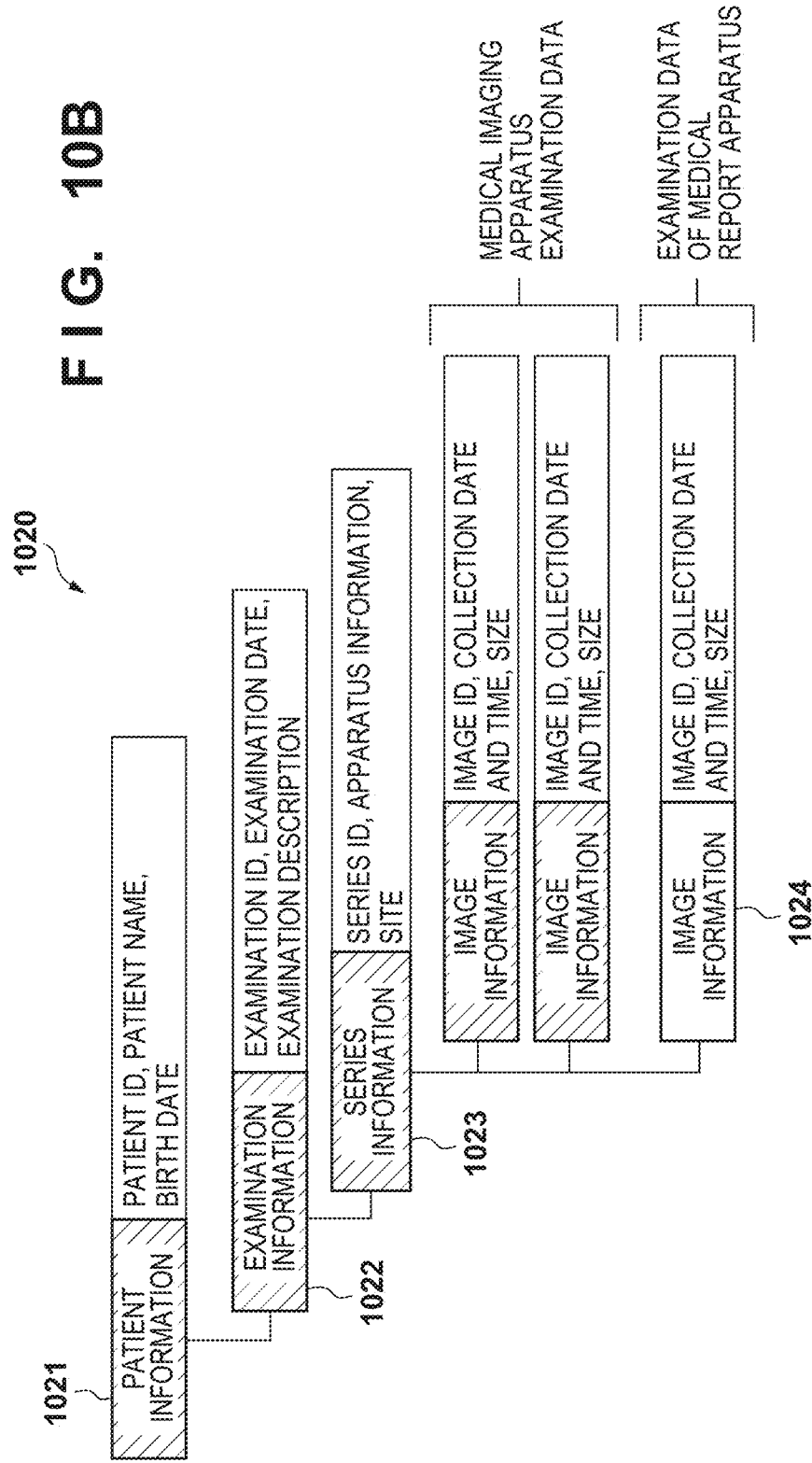

Next, processing of the generating unit 117 when "associate with a series" is set as the association setting will be described. FIG. 10A is a flowchart showing examination data generation processing by the generating unit 117 when the association setting is "associate with a series". FIG. 10B is a view showing an example of the structure of the second examination data generated when the association setting is "associate with a series". Details of processing (step S1000) when "associate with a series" is selected as the association method in step S705 will be described with reference to FIGS. 10A and 10B. When "associate with a series" is selected, the generating unit 117 diverts series information of the first examination data in generating relevant information for image information of the analysis result image.

First, in step S1001, the generating unit 117 copies patient information, examination information, and series information from relevant information of a medical image that is the target of analysis (first examination data). As a result, patient information 1021, examination information 1022, and series information 1023 of the second examination data are generated. Then, in step S1002, the generating unit 117 determines whether to update apparatus information (modality) included in the series information 1023 generated in step S1001. Whether to update the apparatus information is determined by referencing association setting information. As described above, when the check box 521 is checked in the examination data association setting screen 500, update of the apparatus information is recorded in the association setting information. If it is determined to update the apparatus information (YES in step S1002), the generating unit 117 updates in step S1003 apparatus information of the series information 1023 generated in step S1001 by apparatus information of the medical report generation apparatus 110. While a series ID for identifying the series information 1023, and the like are the same as those of series information of the first examination data generated by the medical imaging apparatus 100, the apparatus information can be handled as the medical report generation apparatus 110.

Then, in step S1004, the generating unit 117 associates (stores) image information 1024 of the analysis result image generated by the medical report generation apparatus 110 with the series information generated in steps S1001 to S1003. Accordingly, second examination data 1020 is generated, in which the image information 1024 of the analysis result image generated by the medical report generation apparatus 110 is stored in the series information 1023 having the same series ID as that of the series information generated by the medical imaging apparatus 100. The medical report generation apparatus 110 outputs the second examination data 1020 to the PACS 130 and stores it. The second examination data 1020 stored in the PACS 130 is read out by the medical image referencing apparatus 140. In the medical image referencing apparatus 140, the image information included in the second examination data 1020 is handled as image information belonging to the same series as that of the first examination data output from the medical imaging apparatus 100. Hence, the analysis result information and the medical image can be easily compared and referenced. Note that an image ID for identifying a medical image used for analysis may be added to the image information 1024, similar to the above-described case "associate with an image". In this case, extraction of a medical image based on the series ID and extraction of a medical image based on the image ID can be properly used, improving the usability.

<Case where Association Setting is "Associate with Examination">

Figure 11A:
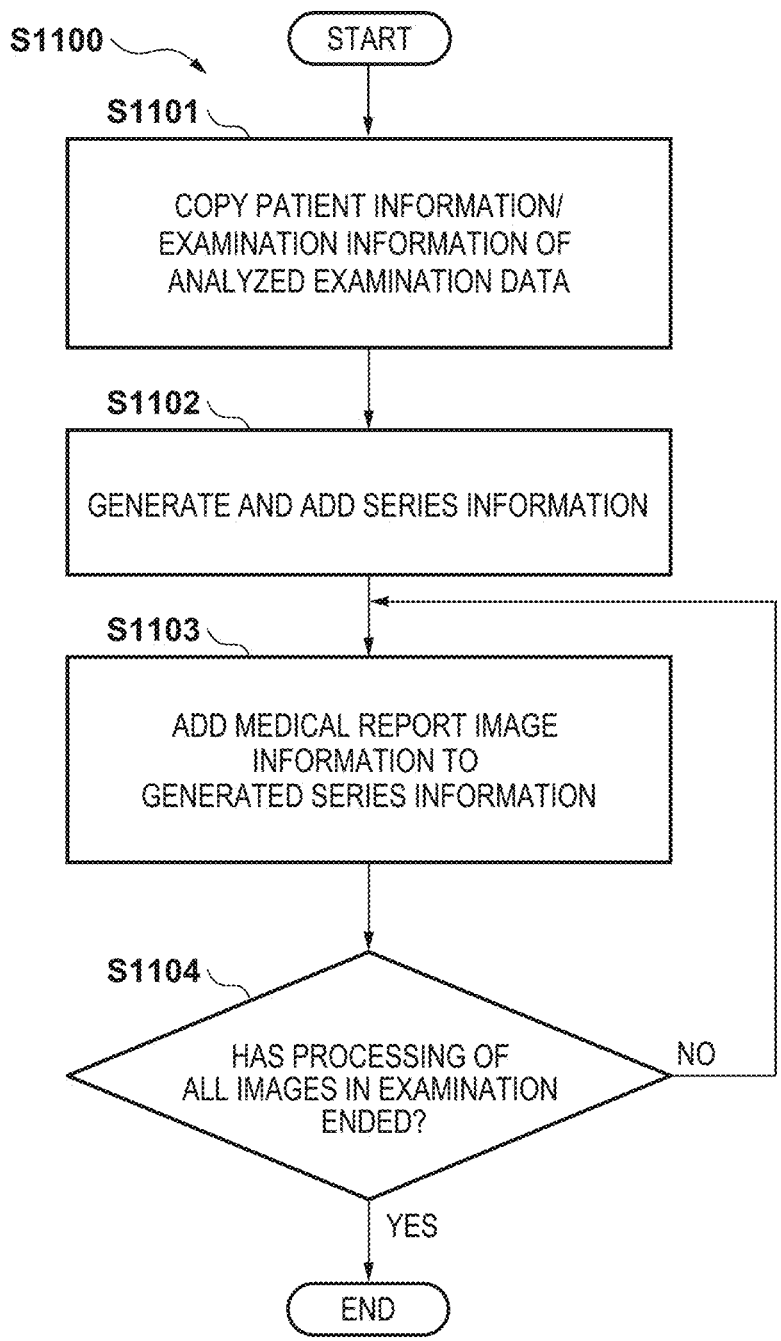

Next, processing of the generating unit 117 when "associate with an examination" is set as the association setting will be described. FIG. 11A is a flowchart showing examination data generation processing by the generating unit 117 when the association setting is "associate with an examination". FIG. 11B is a view showing an example of the structure of the second examination data generated when the association setting is "associate with an examination". Details of processing (step S1100) when "associate with an examination" is selected as the association method in step S705 will be described with reference to FIGS. 11A and 11B. When "associate with an examination" is selected, the generating unit 117 diverts and generates, from the first examination data generated by the medical imaging apparatus 100, examination information with which image information of the analysis result image is associated. The second examination data generated by the medical report generation apparatus 110 therefore has the same examination ID as that of relevant information of the medical image that is the target of analysis.

First, in step S1101, the generating unit 117 copies patient information 1121 and examination information 1122 from relevant information of a medical image that is the target of analysis (first examination data). Then, in step S1102, the generating unit 117 newly generates series information 1124. A series ID different from that of series information 1123 stored in examination information input from the medical imaging apparatus 100 is added to the series information 1124, and the series information 1123 and the series information 1124 are handled as different pieces of series information. Then, in step S1103, the generating unit 117 associates (stores) image information 1125 of the analysis result image with the series information 1124 generated in step S1102. If it is determined in step S1104 that the processing has ended for all analysis result images generated by the analysis unit 116 (YES in step S1104), the process ends. If it is determined that there is an unprocessed analysis result image (NO in step S1104), the process returns to step S1103 to associate image information of the unprocessed analysis result image with the series information 1124.

In this manner, image information of all analysis result images generated by the analysis unit 116 is associated with the series information 1124. Second examination data 1120 including relevant information having the same patient information and examination information as those of the first examination data generated by the medical imaging apparatus 100, and the analysis result information is generated and stored in the PACS 130. When the second examination data 1120 is read out by the medical image referencing apparatus 140, the image information of the analysis result image is handled as the same examination as that of the first examination data output from the medical imaging apparatus 100. Thus, the medical image in the first examination data by the medical imaging apparatus 100, and the analysis result image in the second examination data by the medical report generation apparatus 110 can be handled as the same examination. The analysis result information and the medical image can be easily compared and referenced. Note that an image ID for identifying a medical image used for analysis may be added to the image information 1125, similar to the above-described case "associate with an image". In this case, extraction of a medical image based on the series ID and extraction of a medical image based on the image ID can be properly used, improving the usability.

As described above, the medical report generation apparatus 110 generates relevant information of the second examination data by diverting at least part of relevant information of the first examination data in accordance with association setting information stored in the setting storage unit 114. With this arrangement, for example, even when the second examination data is stored in an image archiving device having no association mechanisms, the second examination data is properly associated with a medical image of the first examination data, enabling an easy comparison/reference in the medical image referencing apparatus. With the association setting in FIG. 5, an association suited to the user's purpose can be performed. In response to selection of one of the first examination data and the second examination data, the medical image referencing apparatus 140 obtains, from a storage device, the other examination data based on information commonly included in the first attendant information and the second attendant information. When the medical image referencing apparatus 140 references an image stored in a storage device such as the PACS 130, the user (viewer) can compare and reference relevant images without performing relevant image association processing, thereby improving the efficiency of image interpretation. For example, the first examination data and the second examination data are stored in the PACS 130 and referenced by the medical image referencing apparatus 140. When one of the first examination data and the second examination data is selected, the medical image referencing apparatus 140 can easily obtain, from the PACS 130, the other examination data associated by information commonly included in their pieces of attendant information.

Note that a form in which the examination data association setting is stored in the setting storage unit 114 has been exemplified in the above-described embodiment, but the present disclosure is not limited to this form. For example, a storage device such as the PACS 130 may hold the examination data association setting, and the medical report generation apparatus 110 may obtain the examination data association setting via the network 150. In this form, the PACS 130 has a function of setting and storing the examination data association setting. Also, an analysis result image has been exemplified as the medical report, but the present disclosure is not limited to this. For example, the medical report may be text information. As the analysis result image, an image in which the image processing object 632 in FIG. 6 is arranged may be included. In this case, the image processing object 632 and the medical image may be images of separate layers. In FIGS. 8A to 11B, one image information is shown as image information included in the second examination data. However, pieces of image information may exist, or image information and text information may coexist. When the medical report generation apparatus 110 executes an examination upon receiving an examination order from the RIS 120, patient information may not be diverted from the first examination data. For example, the medical report generation apparatus 110 may generate patient information by using patient information included in the examination order.

As described above, according to one of techniques of the present disclosure, work of association between pieces of information can be performed efficiently.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-170032, filed Oct. 24, 2022, which is hereby incorporated by reference herein in its entirety.

What is claimed is:

1. A medical image processing apparatus communicably connected to an imaging apparatus, comprising:
an obtaining unit configured to obtain first examination data including image information about a medical image obtained by imaging by the imaging apparatus, and first attendant information added to the image information;
a processing unit configured to perform processing of the image information included in the first examination data; and
a generating unit configured to generate second examination data including processing result information obtained by the processing, and second attendant information that includes at least part of the first attendant information and is added to the processing result information,
wherein the image information and the processing result information are associated by at least part of the first attendant information commonly included in the first attendant information and the second attendant information.

2. The apparatus according to claim 1, wherein the first attendant information represents a class to which the image information belongs, by a plurality of layers including a first layer whose node is the image information, and
the generating unit generates the second attendant information to include, as the at least part of the first attendant information, information of a class of upper layers up to a predetermined layer, out of the class of the plurality of layers in the first attendant information.

3. The apparatus according to claim 2, further comprising a selecting unit configured to prompt a user to select the predetermined layer.

4. The apparatus according to claim 2, wherein the plurality of layers include the first layer, a second layer above the first layer, and a third layer above the second layer, and
when the predetermined layer is the second layer, the generating unit generates the second attendant information by adding the processing result information as a node of the first layer to information of a class up to the second layer in the first attendant information.

5. The apparatus according to claim 4, wherein information of a class of the second layer includes information of a modality that captured the medical image, and the generating unit updates the information of the modality to information representing a modality of the medical image processing apparatus in the second attendant information.

6. The apparatus according to claim 5, further comprising a setting unit configured to prompt a user to set whether to perform the update of the information of the modality.

7. The apparatus according to claim 4, wherein the processing result information includes identification information for identifying the image information used for processing by the processing unit.

8. The apparatus according to claim 4, wherein pieces of information representing the classes of the second layer and the third layer are series information and study information defined by Digital Imaging and Communications in Medicine (DICOM), respectively.

9. The apparatus according to claim 2, wherein the plurality of layers include the first layer, a second layer above the first layer, and a third layer above the second layer, and
when the predetermined layer is the third layer, the generating unit generates the second attendant information by adding information of a class of the second layer to information of a class up to the third layer in the first attendant information, and adding the processing result information as a node of the first layer.

10. The apparatus according to claim 1, further comprising an output unit configured to externally output the second examination data.

11. The apparatus according to claim 1, wherein the processing unit performs processing using a plurality of pieces of image information belonging to an identical class in the first attendant information.

12. The apparatus according to claim 1, wherein the processing unit generates an image representing a measurement result of a bone mineral density as the processing result information.

13. The apparatus according to claim 1, wherein the processing result information includes one of image data representing a result of the processing and text data representing the result of the processing.

14. A medical information generation apparatus comprising:
a medical image processing apparatus defined in claim 1; and
a medical imaging apparatus configured to capture the medical image and generate the first examination data.

15. The apparatus according to claim 14, further comprising:
a storage device configured to store the first examination data and the second examination data; and
a referencing apparatus configured to reference examination data stored in the storage device,
wherein in response to selection of one of the first examination data and the second examination data, the referencing apparatus obtains, from the storage device, the other examination data based on information commonly included in the first attendant information and the second attendant information.

16. A method of controlling a medical image processing apparatus communicably connected to an imaging apparatus, the method comprising:
obtaining first examination data including image information about a medical image obtained by imaging by the imaging apparatus, and first attendant information added to the image information;

performing processing of the image information included in the first examination data; and generating second examination data including processing result information obtained by the processing, and second attendant information that includes at least part of the first attendant information and is added to the processing result information, wherein the image information and the processing result information are associated by at least part of the first attendant information commonly included in the first attendant information and the second attendant information.

17. A non-transitory computer-readable storage medium storing a program for causing a computer to execute a medical image processing apparatus control method defined in claim 16.

* * * * *